May 22, 1945.   F. C. MOCK   2,376,711
PRESSURE AND TEMPERATURE RESPONSIVE MECHANISM
Filed July 12, 1940   2 Sheets-Sheet 1
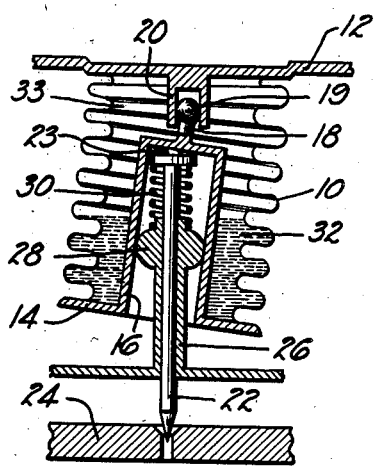
Fig.1
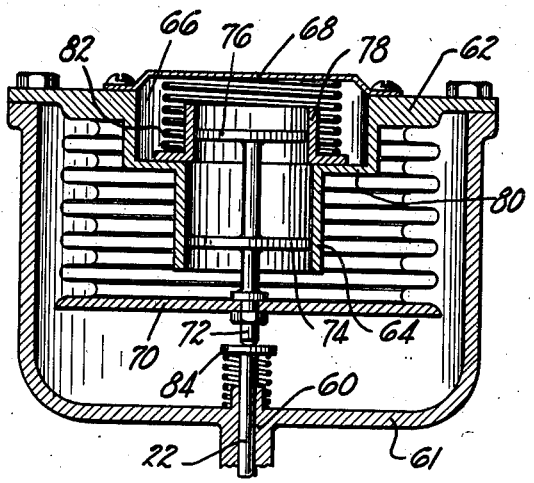
Fig.4
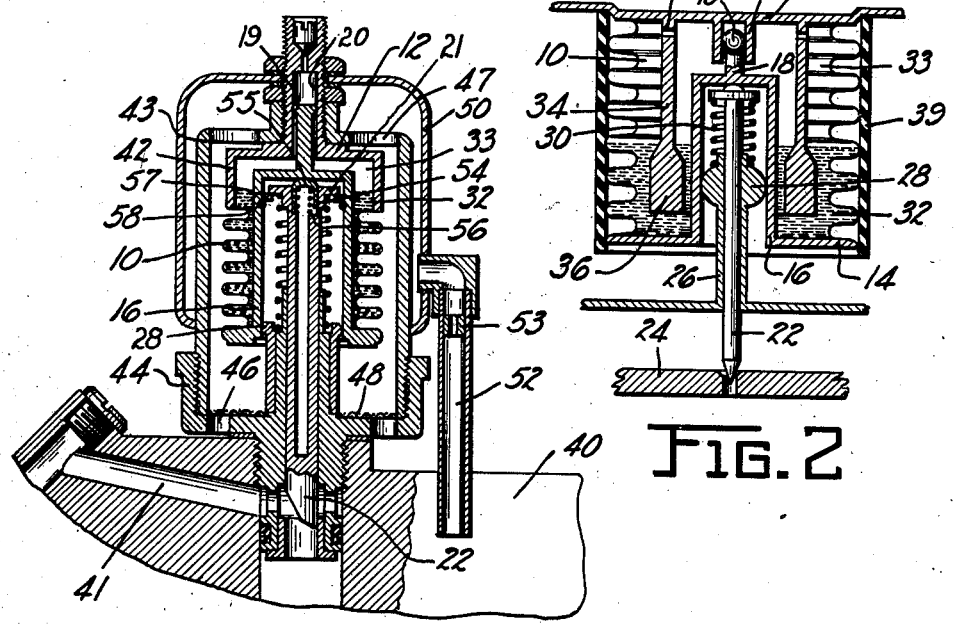
Fig.3
Fig.2
INVENTOR
FRANK C. MOCK
BY A. R. McCrady
ATTORNEY May 22, 1945.  F. C. MOCK  2,376,711
PRESSURE AND TEMPERATURE RESPONSIVE MECHANISM
Filed July 12, 1940   2 Sheets-Sheet 2

INVENTOR
FRANK C. MOCK
BY A. R. McCrady
ATTORNEY

Patented May 22, 1945

2,376,711

UNITED STATES PATENT OFFICE 2,376,711

PRESSURE AND TEMPERATURE RESPONSIVE MECHANISM

Frank C. Mock, South Bend, Ind., assignor to Bendix Products Corporation, South Bend, Ind., a corporation of Indiana Application July 12, 1940, Serial No. 345,089

38 Claims. (Cl. 236—92)

This invention relates to pressure sensitive mechanism, and particularly to corrugated metal bellows of the type used to control a device (such as a valve or a switch) as a function of pressure changes either on the interior or on the exterior of the bellows, or as a function of temperature changes to which the unit is subjected, or as a correlated function of both temperature and pressure changes to accomplish density responsiveness. The instant application is a continuation-in-part of my copending application Serial No. 120,654, filed January 15, 1937.

Devices of this type have been particularly useful in carburetors for internal combustion engines, particularly aircraft engines, to control carburetor elements in response to variations in the pressure, temperature, or density of one of the working fluids.

Where such a device is used in an installation where it is subjected to vibration, as on an aircraft motor, it is found that its life is shortened because the vibration sets up sympathetic vibrations in the bellows which fatigue the metal of the walls until failure occurs by fracture of the walls. Such vibration is particularly destructive when its frequency equals the natural periodicity of the bellows or a harmonic thereof, and may be of various types. Assuming the bellows to have one of its ends fixed to a member which is subject to vibration, and its other end relatively free, the vibration may be simply an alternate lengthening and shortening of the bellows, in which each corrugation shares about equally. Secondly, the vibration may consist in a swinging motion of the free end of the bellows about its fixed end as a pivot. A third type of vibration, which may occur even if both ends of the bellows are fixed, consists in waves of compression and extension which travel longitudinally of the bellows, so that, at any given instant, the several corrugations are unequally stressed. Two or all of these types of vibration, and other types not above described, may of course be present at the same time in the same bellows.

A bellows of this type usually comprises a flexible corrugated cylindrical wall, a base which is relatively fixed, and a relatively free end which is connected to the controlled member, which may be a valve, an electric switch, or any device capable of being controlled by the movement of the bellows. The flexible wall may be elongated or compressed, or may be bent into the arc of a circle, without putting undue strain on said wall, but if the free end is moved transversely of the bellows while maintaining said end parallel to the plane of the base, as may happen by reason of defective manufacture or assembly of the parts, or by displacement thereof in use, the corrugations are put under undue stress and the bellows will not function properly.

It is an object of the instant invention to eliminate or reduce vibration and undue stress in apparatus of this type, so as to improve the operation and lengthen the life of the apparatus. This is done by providing dampening means in association with the bellows, and by providing an improved universal connection between the bellows and the controlled member whereby one may be moved laterally with respect to the other without putting the bellows under undue stress.

A further object of the invention is to provide an improved construction whereby apparatus of this type will function accurately and dependably under exacting requirements, rather than erratically as in devices of the prior art.

It is a further object to provide a device which will accurately maintain its calibration over long periods of service and will respond to variations in the density of the air surrounding the bellows irrespective of whether the change in density results from a change in the temperature or pressure of the surrounding air.

Further objects and advantages of the invention will be apparent from the following description, taken in connection with the appended drawings, in which:

Figure 1 is a longitudinal section taken through a device embodying the invention;

Figure 2 is a similar view showing a modification of the invention;

Figure 3 is a similar view showing another modification of the invention;

Figure 4 is a similar view showing still another modification of the invention.

Figure 5:
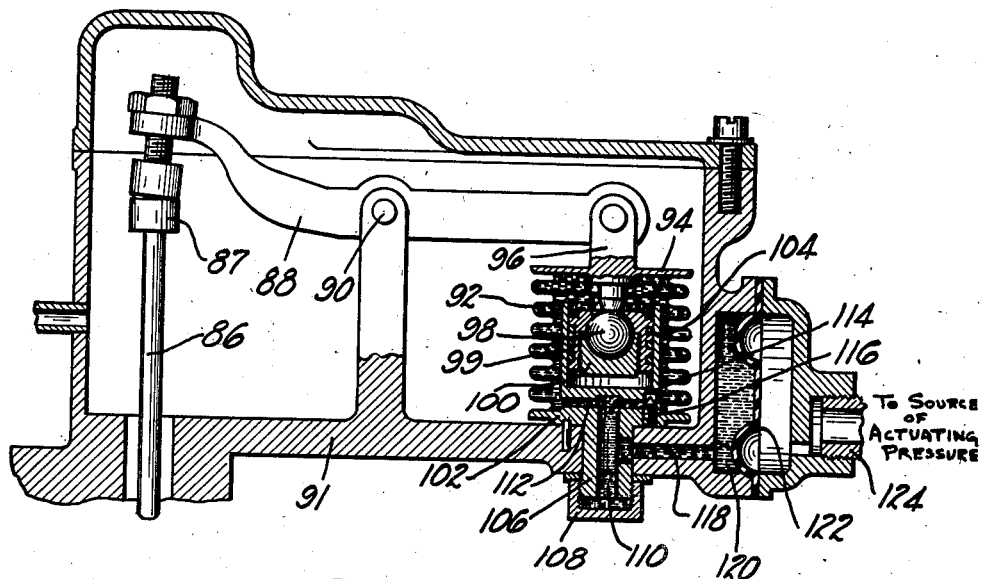
Figure 5 is a similar view showing a still further modification of the invention.

The device disclosed in Figure 1 comprises a flexible metallic bellows 10 of the known type, secured at its upper end to a base 12 of a relatively fixed member which seals the end of the bellows. The other end of the bellows is movable relative to the fixed end and is closed by a plate 14 having a cylindrical portion 16 extending within the bellows and terminating in a stud 18 having a spherical end 19 which slidably engages a cylinder 20 depending from the fixed member 12. The control member in this case is shown as a needle valve 22 which cooperates with a fixed valve member 24 to control the flow of fluid through an orifice in the latter. The valve 22 is slidably guided by a fixed sleeve 26 which is provided with an annular boss 28 which slidably engages the interior of cylindrical portion 16. The top of the valve 22 is rounded as at 23 so as to slidably engage the interior of portion 16. A compression spring 30 tends to maintain valve 22 off its seat.

The interior of the bellows is partially filled with a body of oil 32 of suitable and relatively constant viscosity, a space 33 being left above the oil level to permit the bellows to function. By regulating the volume of the enclosed space 33 above the oil and the stiffness of spring 30 the sensitivity or amount of valve movement for given pressure changes may be conveniently regulated. Furthermore, the sensitivity of the bellows to changes in temperature may be regulated by controlling the absolute pressure within the bellows at the time of sealing the same, it being not responsive to temperature changes if the space is entirely evacuated and becoming increasingly responsive to temperature changes as the absolute pressure within the bellows is increased. By correlating the volume of this space and its absolute pressure at the time of sealing it is possible to obtain a device which will respond accurately to changes in air density irrespective of whether the change results from change in air temperature or change in air pressure. It will be readily apparent that the bellows will tend to collapse as the space 33 is evacuated. The natural elasticity of the bellows will tend to resist such collapse due to evacuation; however, if the degree of evacuation is high it may be necessary to use a compression spring within the bellows to assist in resisting the collapsing action due to the evacuation.

If the space 33 above the oil is filled with air, it has been found that the valve setting or calibration of the unit will change with use as the oxygen in the air combines with the oil, thus changing the effective internal pressure. Such a change in the internal pressure also disturbs the correlation between the pressure and the temperature responsiveness necessary for accurate density compensation. By using nitrogen within the bellows it has been found that the unit will maintain its calibration over long periods of use. Other inert gases having no tendency to combine with the oil and substantially no tendency to dissolve in the oil may also be used, gases having such characteristics being herein designated as inert gases.

It is assumed that members 20, 18, 16, 28, 22 and 24 were designed to aline perfectly with each other, but that defects of manufacture or assembly, or the stresses occurring in service, produced the misalinement shown in Figure 1. The construction permits such misalinement without putting undue strains on the bellows, and also prevents vibration of the types above discussed, type 2 being prevented by the engagement of portion 16 with boss 28, and types 1 and 3 being damped out by the oil 32, which opposes rapid changes in the shape of corrugations such as the latter two types of vibration involve. If it is desired to increase the damping effect of the oil the dimension between the exterior of cylindrical member 16 and the interior of the bellows 10 may be reduced, thus forming a limited area between these two members through which the oil must be forced during periods of vibration. If the clearance between these two members is made equal to or preferably less than the internal distance between the walls of a convolution, as is best shown in Figure 3, the damping effect of the oil is materially increased. It will be readily apparent that the effectiveness in damping of this clearance dimension will vary with changes in the viscosity of the oil used. However, by proper adjustment of viscosity and the clearance any degree of damping is obtainable.

The device shown in Figure 2 is generally similar to that just described except as hereinafter noted. Depending from the base 12 is a cylindrical member 34 which has its lower end 36 enlarged to form an annular plunger which cooperates with the body of oil 32 lying between members 16 and the walls of bellows 10 to form a dashpot which resists quick movements of contraction and expansion in the bellows. Here again the adjustment of the clearance between member 36 and member 10 and also between member 36 and member 16 will provide any desired degree of damping. Member 34 is provided near its top with ports 38 designed to equalize the pressures existing interior and exterior of member 34. By controlling the size of ports 38 a limited amount of air or gas damping action may be obtained. The space 33 above the oil is, as before, preferably filled with nitrogen or some other inert gas. For further damping of the vibrations in the corrugations of bellows 10 a rubber sleeve 39 may be placed outside of the bellows in frictional relation to the outer walls of the bellows. The sleeve 39 is preferably deformable to permit transverse movement of one end closure plate relative to the other as is experienced when misalinement is present between the parts of the assembly. It will be readily apparent that the damping actions obtained by the clearance between member 36 and members 10 and 16, by the air port 38, and by the rubber sleeve 39 each acts independently of the others and is adapted for use either by itself or in combination with one or more of the other arrangements. The rubber sleeve 39 is equally applicable for use with the other embodiments as well.

Figure 3 illustrates a further embodiment of the invention applied to an internal combustion engine carburetor having an air inlet 40 and a control passage 41 which may be a fuel passage, an air passage, or may serve to connect a control diaphragm or the like to a variable source of pressure such as the engine intake manifold. The fixed member 12 includes a cylindrical chamber portion 42 to which the collapsible bellows 10 is secured thus forming a chamber having a collapsible lower portion and a non-collapsible upper portion. The member 12 is carried by a housing 43 which is supported by a member 44 rigidly secured to the carburetor body. Perforations 46, 47 are formed in the member 44 and housing 43 respectively to provide for circulation of air or other fluid around the bellows as hereinafter described. Preferably the perforations 46 in the member 44 are covered by gauze 48 or the like to filter the air. A cylindrical shell or cap 50 surrounds and encloses the upper portion of housing 43 and is secured thereto by locking nuts as shown. A pipe 52 leads from the space enclosed by the cap 50 to the air intake or to some other source of moderate suction. The air or other fluid, the temperature and pressure variations of which it is desired to compensate for, is drawn through ports 46, past the surface of the bellows 10, through the ports 47 and discharges through pipe 52. The bellows is thus maintained at the temperature of the air or other fluid and will quickly respond to sudden changes in the temperature and pressure thereof, such as might occur if the airplane rapidly ascended or descended. A restriction 53 may be used in pipe 52, if desired, to prevent any undue transmission of suction to the interior of housing 43 which might otherwise interfere with the bellows accurately responding to the pressure of the fluid supplied to ports 46.

The cylinder 16 lies closely adjacent to the inner part of the corrugations in the bellows to restrict the passage for flow of oil 32 between adjacent corrugations. Thus the oil 32 serves to damp vibrations of the bellows. It should be noted that the entire collapsible portion of the enclosed chamber is filled with oil, the air or inert gas space 33 being confined to the non-collapsible portion, thus permitting the oil to damp the vibrations in all of the corrugations. A recess 54, provided in the enlarged head 21 of valve 22 slidably receives a hollow plunger 55. A relatively stiff spring 56 urges the rounded head of plunger 55 against the upper end of cylinder 16 and the head of valve 22 against a retaining washer 57 and a snap ring 58, the latter being received in a groove in the wall of cylinder 16. The valve 22 is thus prevented from moving vertically relative to the cylinder 16 but is permitted, by the clearance between the head of valve 22 and the cylinder 16, to move transversely relative thereto if misalinement is present. Misalignment between the valve 22 and the cylinder 16 is thus accommodated in exactly the same manner as in the modification of Figure 1, the rounded head 19 forming a pivot for angular movement of the cylinder 16 and the rounded boss 26 and the clearance between the head 21 and cylinder 16 permitting this angular movement relative to the valve 22.

In the device shown in Figure 4, the controlled member 22 is slidably seated in a sleeve 60 which is formed integral with a cup 61 fixed to the base member 62. A cylindrical member 64 depends from the base 62, its upper portion being enlarged to form an air chamber 66 with the plate 68. The lower end of the bellows is closed by a plate 70, to which is secured a plunger 72 comprising a lower disc 74 which slides within member 64, and an upper disc 76 which slidably engages a floating annular member 78 held in frictional relation with the shoulder 80 of member 64 by a spring 82. It will thus be seen that disc 76 and chamber 66 form an air dashpot which tends to damp out longitudinal vibrations in the bellows, and that any misalinement between the bellows and the plunger 72 will be taken care of by a pivoting of said plunger about disc 74, member 78 being moved laterally to accommodate such movement. The plunger 72 slidably engages the enlarged head 84 of member 22 to accommodate misalinement between these two members.

In the modification of Figure 5, the controlled member 86 is connected through a universal connection 87 to one end of a lever 88 which is pivotally mounted at 90 on an extension of the base member 91. A bellows 92 is closed at its upper end by a plate 94 which is fixed to or formed integral with a rod 96. The rod 96 is pivotally connected at its upper end to the lever 88 and terminates at its lower end in a ball 98 which is secured in a piston 99 by a plug 100 to form a universal connection therewith. The lower end of the bellows is closed by a plate 102 having an upper cylindrical extension 104 slidably receiving the piston 99 and a lower tubular extension 106 extending through the base member 91 and secured thereto by cap 108.

A vertical passage 110 in the extension 106 communicates with the free space within the bellows through a plurality of radial passages 112 and one of said passages 112 communicates with the interior of the cylinder 104 through a port 114 controlled by an adjustable needle valve 116. The passage 110 is provided with a port which communicates with a duct 118 leading to a chamber 120 closed by a diaphragm 122. The other side of the diaphragm is connected through a pipe 124 to a source of the variable pressure which is to be used to actuate the bellows. The bellows 92, chamber 120 and interconnecting passages are filled with oil or other liquid of substantially constant viscosity regardless of temperature changes, thus providing a solid liquid column from the diaphragm 122 to the bellows 92 so that any variations in pressure in the pipe 124 will be transmitted through the diaphragm substantially undiminished to the bellows.

The cylinder 104 may be closely adjacent the inner edges of the corrugations to restrict the flow of oil into and out of the corrugations for damping vibrations. This construction permits misalinement and damps out vibration. In addition the piston 99 and the variable port 114 provides a dashpot which permits of obtaining any desired amount of damping.

It will be readily apparent that the dashpot piston arrangement in the bellows 92 of Figure 5 is not limited to the diaphragm type of pressure actuation and would be equally applicable in a sealed and partially liquid-filled bellows of the type disclosed in Figures 1 to 3.

While several of the embodiments of the invention have been shown and described in detail, it is to be understood that the invention is not limited thereto or otherwise than by the terms of the appended claims.

I claim:

1. A sensitive element comprising a hollow flexible member adapted to change its shape in response to variations in pressure on opposite sides thereof, means for rigidly mounting one end of said member, angularly movable means slidable relative to each other longitudinally of the flexible member for connecting the opposite end of the member to said one end, and means including a body of liquid inside of said member to damp vibrations therein.

2. A sensitive element comprising a flexible tubular shell, means for rigidly mounting one end of said shell, means closing the opposite end of said shell, means including a body of liquid inside of said shell for damping vibrations therein, a ball element carried by one of said means, and a guide member carried by the other of said means and engaging said ball element to form a relatively slidable and angularly movable joint.

3. A sensitive element comprising a tubular bellows, means for rigidly mounting one end of said bellows, means for closing the other end of said bellows including a tubular guide portion, a fixed guide member including an enlarged head angularly and longitudinally slidable relative to said guide portion, and a member to be actuated slidably carried by said guide member and engaging said closing means.

4. A sensitive element comprising a tubular bellows, means for rigidly mounting one end of said bellows, means for closing the other end of said bellows including a tubular guide portion, a fixed guide member including an enlarged head slidably engaging said guide portion, a guide sleeve rigidly carried by one of said means, and a ball element carried by the other of said means and slidably engaging said guide sleeve.

5. A sensitive element comprising a tubular bellows, means for rigidly mounting one end of said bellows, means for closing the other end of said bellows including a tubular guide portion, a fixed guide member including an enlarged head slidably engaging said guide portion, a guide sleeve rigidly carried by one of said means, and a ball element carried by the other of said means and slidably engaging said guide sleeve, said bellows adapted to contain a body of liquid to damp vibrations thereof.

6. A sensitive element comprising a tubular bellows, means for closing the ends of said bellows, said bellows being adapted to contain a body of liquid, and an annular plunger carried by one of said means and projecting into said body of liquid, said plunger being formed with restricted ports, whereby vibrations of the bellows will be damped.

7. A sensitive element comprising a tubular bellows, means for closing the ends of said bellows, a tubular member carried by one of said means and lying inside of the bellows, and a plunger carried by the other of said means and slidable in said tubular member to damp vibrations of the bellows.

8. A sensitive element comprising a tubular bellows, means for rigidly mounting one end of the bellows, means for closing the other end of said bellows, a dashpot cylinder carried by one of said means, a piston in said cylinder and connected to the other of said means, said bellows and cylinder adapted to contain liquid, and means forming a restricted conection between the inside and the outside of said cylinder.

9. A sensitive element comprising a tubular bellows, means for rigidly mounting one end of said bellows, means for closing the other end of said bellows including a tubular guide portion, a fixed guide member including an enlarged head slidably engaging said guide portion, a guide sleeve rigidly carried by one of said means, a ball element carried by the other of said means and slidably engaging said guide sleeve, a control element slidably carried by said guide member, said control element having a ball shaped end adapted to engage the end of said tubular guide portion, and a spring to urge said ball shaped end into engagement with the tubular guide portion.

10. A sensitive element comprising a tubular bellows having upper and lower ends, means closing the ends of said bellows, a body of liquid in said bellows, an annular plunger depending from the upper of said means and projecting into said body of liquid thereby dividing the space above the liquid into two chambers, and restricted ports in the plunger connecting said chambers whereby vibrations of the bellows will be damped.

11. A sensitive element comprising a hollow flexible chamber having a wall adapted to move toward and away from an opposite wall, a dashpot cylinder carried by one of said walls, and a piston carried by the other of said walls and slidably engaging the cylinder to damp vibrations of said movable wall.

12. A sensitive element comprising a hollow flexible member adapted to change its shape in response to variations in pressure on opposite sides thereof, a relatively fixed base member closing one end of said member, a relatively movable member closing the other end of said member, a rigid extension projecting from said movable member, and means providing an angularly movable, longitudinally slidable connection between said base member and said extension adjacent said one end of the flexible member.

13. A control device comprising a relatively fixed plate, a hollow flexible member having one of its ends secured to said plate, said member being adapted to change its shape in response to variations in pressure on opposite sides thereof, a second plate secured to the other end of the flexible member and movable relative to the first named plate, and a non-deformable member rigidly connected to one of said plates and forming a longitudinally slidable universal connection with the other of said plates adjacent said one end of the flexible member.

14. A sensitive element comprising a hollow flexible member adapted to change its shape in response to variations in pressure on opposite sides thereof, means for mounting one end of said member on a member subject to severe vibrations, means including a body of fluid of relatively constant viscosity filling a predetermined portion of said flexible member and contacting the sides thereof to damp vibrations therein, the remaining portion of the hollow space within said member being subjected to a predetermined degree of evacuation to remove air and its contained chemically active constituents, and a predetermined quantity of temperature-responsive inert gas in the evacuated space enclosed by said flexible member to minimize association with or dissolution in the damping liquid and thereby avoid change in the temperature-responsive calibration of the device.

15. A sensitive element adapted to control a carburetor element of an aircraft engine in accordance with changes in air density accompanying changes in altitude comprising a tubular bellows, means for sealing the ends of said bellows, a body of oil filling a predetermined portion of the bellows to damp vibrations therein, and a predetermined quantity of temperature-responsive gas filling the remainder of said bellows said gas being of an inert type having a low affinity for and a low factor of solubility in the damping liquid whereby the gas content of the device will remain constant over long periods of time to thereby provide lasting temperature calibration of the device.

16. A pressure responsive device comprising a deformable cylindrical member, a fixed plate closing one end of said member, a plate movable relative to said fixed plate closing the other end of said member, a member fixed to one of said plates and engaging a portion of the other of said plates to form a longitudinally slidable and angularly movable connection therebetween, a body of liquid partially filling said deformable member, and an inert gas filling the remainder of said deformable member.

17. A pressure responsive device comprising a corrugated metallic member, a fixed plate closing one end of said member, a relatively movable plate closing the other end of said member, and a deformable casing enclosing said corrugated member and frictionally engaging the sides thereof to damp vibrations.

18. A pressure responsive device comprising a hollow flexible member adapted to change its shape in response to variations in pressure on opposite sides thereof, a relatively fixed plate closing one end of said member, a relatively movable plate closing the other end of said member, and a deformable sleeve connected to one of said plates and surrounding and frictionally engaging the sides of said flexible member.

19. A sensitive element comprising a flexible bellows, a pair of plates closing the ends of said bellows, means forming a universal connection between said plates permitting longitudinal relative movement of said plates, and a deformable sleeve surrounding and frictionally engaging said bellows to damp vibrations thereof.

20. A pressure sensitive element comprising a sealed chamber having a lower corrugated bellows-like deformable portion and an upper rigid-walled cylindrical non-deformable portion, a body of damping liquid completely filling said deformable portion and a gas filled space above said body of liquid, the level of the liquid being above the uppermost corrugation of the bellows-like portion, to thereby dampen vibration throughout the entire corrugated area of the chamber and avoid localized stresses in the region of the nondeformable portion.

21. A pressure sensitive element comprising a sealed chamber, a bellows-like flexible member forming a deformable lower portion of said chamber and adapted to change its shape in response to variations in pressure on opposite sides thereof, a hollow non-flexible member forming a non-deformable upper portion of said chamber, a body of liquid in the deformable portion, the level of the liquid being above the uppermost fold of the bellows-like member to thereby dampen vibration throughout the entire wall area of said deformable portion, said upper portion having a space therein above the liquid level filled with an inert gas.

22. A sensitive element comprising a sealed chamber, a deformable member forming the lower portion of said chamber, a non-deformable member forming the upper portion of said chamber, and a body of vibration-damping liquid completely filling the deformable portion but only partially filling the entire chamber, the chamber containing an inert gas above the liquid.

23. A sensitive element comprising a tubular bellows, means for closing the ends of said bellows and forming therewith a sealed chamber, and means forming a longitudinally slidable universal connection within the chamber between said closing means including a guide member carried by one of said means and a plunger carried by the other of said means and slidable in said guide member to damp vibrations of the bellows.

24. A sensitive element comprising a tubular bellows, means for closing the ends of said bellows, and a dashpot for damping vibrations in the bellows, said dashpot including a cylinder member carried by one of said means and lying inside of the bellows, and a plunger member carried by the other of said means and slidably engaging said cylinder member.

25. The invention defined in claim 24 wherein said dashpot includes a universal connection to permit misalinement of said closing means.

26. A sensitive element comprising a tubular bellows, a base member closing one end of said bellows, a relatively movable member closing the opposite end of said bellows, a body of liquid in said bellows to damp vibrations thereof, a control element, and means forming a universal connection between said control element and said movable member.

27. A pressure responsive device comprising a hollow corrugated metallic cylinder, a fixed member closing one end of said cylinder, a relatively movable member closing the other end of said cylinder, and means for damping vibrations in said corrugated cylinder including a body of liquid therein, and a cylindrical member extending from one of said closing members into said cylinder closely adjacent the corrugated wall thereof, the clearance between the cylindrical member and the wall being less than the distance between the inner surfaces of the transversely extending walls of the corrugations, to thereby restrict the flow of liquid into or out of the corrugations.

28. A pressure sensitive device comprising a sealed chamber having two relatively movable walls adapted to respond to variations in pressure on the inside and outside of the chamber, means for rigidly mounting one of said walls, a dashpot cylinder carried by one of said walls, a piston in the cylinder connected to the other of said walls, said bellows and cylinder adapted to contain liquid, and means forming a restricted communication between the inside and outside of said cylinder.

29. The invention defined in claim 28 wherein the connection between the piston and the other of said walls includes a universal connection.

30. A pressure sensitive device comprising a sealed chamber having two relatively movable walls responsive to variations in the pressures within and outside of said chamber, means for rigidly mounting one of said walls, and means for damping relative vibration of said walls comprising a dashpot cylinder carried by one of said walls, and a piston in the cylinder connected to the other of said walls.

31. A pressure sensitive control unit comprising a corrugated bellows, a member closing one end of said bellows, a second member closing the other end of the bellows including a cup-like portion extending within the bellows, a recess in one of said members forming a guide portion, a projection from the other of said members having an enlarged rounded end slidably received within the guide portion, means for rigidly mounting one of said members, and a control element abutting against the other of said members to be actuated thereby.

32. A pressure sensitive control unit comprising a housing, a corrugated bellows within the housing, a member closing one end of said bellows and secured to one portion of the housing, a recess in said member forming a guide portion, a member closing the other end of the bellows including a cup-like portion extending within the bellows and having a projection slidably received within the guide portion, a projection from an oppositely disposed portion of the housing in slidable relation with the cup-like portion, a central bore in said last-named projection, and a control element in said bore in abutting relation with the base of said cup-like portion.

33. A pressure sensitive control unit comprising a housing including a base and a cover, a corrugated bellows within the housing, a member closing one end of the bellows and secured to the cover, a recess in the member forming a guide portion, a second member closing the other end of the bellows and having a cup-like portion extending within the bellows, a guide extending from the second member and having an enlarged rounded end slidably received in the guide portion, a pair of oppositely extending central projections from the base of the housing, one of said projections extending within the said cup-like portion in slidable relation therewith and the other being threaded, a central bore in said projections, and a control element in said bore extending into the cup-like portion and engaging the bottom thereof.

34. A pressure responsive device comprising a corrugated metallic cylinder, a rigid cylindrical member coaxial with the cylinder and having its walls closely adjacent the corrugated walls of the cylinder, means including the cylinder and the cylindrical member forming a sealed chamber, and means for damping vibrations in the corrugated cylinder including a body of liquid in the chamber, the clearance between the cylindrical member and the corrugated wall of the cylinder being less than the distance between the inner surfaces of the transversely extending walls of the corrugations to thereby restrict the flow of liquid into or out of the corrugations.

35. A density-responsive device comprising a sealed chamber defined in part by a deformable wall and in part by a non-deformable wall, that portion of the chamber having a deformable wall containing a damping liquid functioning to prevent localized vibration stresses, and an inert temperature-responsive gas replacing air in said chamber above said liquid, said gas providing a temperature response and also serving to prolong the calibrated life of the device due to its lack of affinity with the oil.

36. A sensitive element comprising a tubular bellows, means secured to the ends of the bellows to form therewith a closed chamber, a body of damping liquid filling a predetermined portion of the chamber to damp vibrations in said bellows, and a predetermined quantity of temperature-responsive gas filling the remainder of the chamber, said gas being of an inert type having a low affinity for and a low factor of solubility in the damping liquid whereby the gas content of the device will remain constant over long periods of time to thereby provide lasting temperature calibration of the device.

37. A density-responsive device adapted to control the quantity of fluid flowing through a passage in response to variations in pressure and temperature of air flowing through another passage, comprising a sealed corrugated bellows filled in part with a damping fluid and in part with an inert temperature-responsive gas, a support for said bellows adapted to be mounted adjacent said second-named passage and including a housing defining in conjunction with the bellows a restricted flow passage for flowing air past the bellows, means holding one end of said bellows fixed with respect to its support, a control element operatively connected to the opposite movable end of said bellows and projecting into said first-named passage for controlling the latter, and a conduit communicating at its inlet end with said flow passage and at its outlet end projecting into said second-named passage, air flowing past the outlet end of said conduit providing a draft effect in said flow passage to accelerate circulation of air therethrough and quicken response of the bellows to variations in temperature and pressure of air in said second-named passage.

38. A density-responsive device adapted to control the quantity of fluid flowing through a passage in response to variations in temperatures and pressure of air flowing through another passage, comprising a sealed corrugated bellows filled in part with a damping fluid and in part with an inert temperature-responsive gas, a support for said bellows adapted to be fixed to a member adjacent said second-named passage, a housing having air intake and discharge ports therein projecting from said support and extending adjacent said bellows and providing in conjunction with the latter a restricted flow passage for flowing air past the bellows, one end of said bellows being held fixed with respect to its support and the opposite end of said bellows being free for movement with respect to said support, a control element operatively connected to the movable end of the bellows and projecting into said first-named passage for controlling flow of fluid through the latter, a protective shell enclosing at least the upper portion of said housing, and a conduit communicating at its inlet end with said flow passage through said shell and at its discharge end projecting into said second-named passage in a manner such as to provide an ejector action with respect to said flow passage and expedite circulation of air between the bellows and housing.

FRANK C. MOCK.